(12) United States Patent
Ferlitsch

(10) Patent No.: US 7,304,760 B2
(45) Date of Patent: Dec. 4, 2007

(54) PROVIDING CAPABILITIES MATCHING FOR CLUSTER PRINTING

(75) Inventor: Andrew Rodney Ferlitsch, Tigard, OR (US)

(73) Assignee: Sharp Laboratories of America, Inc., Camas, WA (US)

( * ) Notice: Subject to any disclaimer, the term of this patent is extended or adjusted under 35 U.S.C. 154(b) by 794 days.

(21) Appl. No.: 10/260,910

(22) Filed: Sep. 30, 2002

(65) Prior Publication Data

US 2004/0061890 A1 Apr. 1, 2004

(51) Int. Cl.
*G06K 1/00* (2006.01)

(52) U.S. Cl. .................. 358/1.15; 358/1.1; 358/1.13

(58) Field of Classification Search ............... 358/1.15, 358/1.13, 1.14, 1.1; 709/203, 229, 230, 239
See application file for complete search history.

(56) References Cited

U.S. PATENT DOCUMENTS

| | | | | |
|---|---|---|---|---|
| 6,157,465 A | 12/2000 | Suda et al. | ................. | 358/407 |
| 6,202,092 B1 | 3/2001 | Takimoto | .................... | 709/225 |
| 6,233,414 B1 | 5/2001 | Farrell | ......................... | 399/81 |
| 6,266,693 B1 | 7/2001 | Onaga | ........................ | 709/219 |
| 6,337,745 B1 | 1/2002 | Aiello, Jr. et al. | ......... | 358/1.15 |
| 6,348,971 B2* | 2/2002 | Owa et al. | .................. | 358/1.15 |
| 6,452,692 B1* | 9/2002 | Yacoub | ..................... | 358/1.15 |
| 6,498,656 B1 | 12/2002 | Mastie et al. | ............. | 358/1.15 |
| 6,816,275 B1* | 11/2004 | Aoki | .......................... | 358/1.15 |
| 6,940,615 B1* | 9/2005 | Shima | ....................... | 358/1.15 |
| 6,943,905 B2* | 9/2005 | Ferlitsch | .................... | 358/1.13 |
| 7,081,969 B1* | 7/2006 | Motamed et al. | ......... | 358/1.16 |
| 2002/0063880 A1 | 5/2002 | Raney | ....................... | 358/1.14 |
| 2002/0116439 A1 | 8/2002 | Someshwar et al. | ....... | 709/104 |
| 2003/0035122 A1 | 2/2003 | Amarger et al. | ............ | 358/1.1 |
| 2003/0086114 A1 | 5/2003 | Cherry et al. | ............. | 358/1.15 |

FOREIGN PATENT DOCUMENTS

| | | |
|---|---|---|
| EP | 0 917 042 | 5/1999 |
| EP | 0 738 949 | 2/2002 |

* cited by examiner

*Primary Examiner*—Kimberly A. Williams
(74) *Attorney, Agent, or Firm*—Michael F. Krieger; Kirton & McConkie

(57) ABSTRACT

Systems and methods for providing capabilities matching in a printing environment, including performing copy splitting, document splitting, color separation, pool printing, finishing, sheet assembly, and the like. Capabilities needed to perform a print job are matched with the available capabilities of the printing devices in the system. In some embodiments, a print processor is used in performing the capabilities matching. The print job is then selectively routed to one or more printing devices to process the print job.

17 Claims, 10 Drawing Sheets

PROVIDING CAPABILITIES MATCHING FOR CLUSTER PRINTING

BACKGROUND OF THE INVENTION

1. Field of the Invention

The present invention relates to processing a print job. In particular, the present invention relates to systems and methods for providing capabilities matching for cluster printing in a heterogeneous printing environment, including performing copy splitting, document splitting, color separation, pool printing, finishing, sheet assembly, and the like.

2. Background and Related Art

Techniques currently exist that enable a print job to be processed. For example, a user typically initiates a print job by selecting a printing device and specifying one or more print options associated with the printing device. Once the print job is initiated, the printing instructions of the print job are passed to the printer driver corresponding to the selected printing device. The printer driver generates the print job, which is then spooled to a spooler. The spooler then despools the print data on an immediate or delayed basis to the print processor associated with the selected printing device. If the print job contains rendered data, the print processor writes the data directly to the port manager of the selected printer.

If the print job includes journaled data, the print processor plays back the journaled data to the corresponding printer driver, which converts the journaled data into rendered data and spools the print data to the spooler. The spooler then despools the print job on an immediate or delayed basis either to the print processor (e.g., WinN7/2K/XP), which writes the print data directly to the port manager of the selected printing device, or directly to the port manager (e.g., Win98/Me).

Each printing device typically includes options that are specific to that particular printing device. Examples of such options that are currently available include optional finishers, trays, duplexing capabilities, etc. The options are displayed by the printer driver and can be grouped into device independent options (e.g., number of copies) or device dependent options (e.g., stapling). Device dependent options are generally stored and retrieved from a common location. For example, device dependent options in the Microsoft Windows® family of operating systems are referred to as device configuration settings and are preserved in the system registry.

Configuration settings of a printing device are automatically set during installation or manually set after installation. For example, once the network address is set for a network-printing device, the installer may query the device for its specific configuration (e.g., SNMP/IPP). Alternatively, in the Microsoft Windows® family of operating systems, device configuration settings may be set from the properties menu for the device settings property page.

Current printing techniques include the ability to divide a print job amongst a plurality of printers and/or routing a print job to the best-match or most available printer in a printer pool. This process is typically referred to as "cluster printing." One example of cluster printing utilizes firmware support that is located in the printing devices. The printing devices support tandem printing within the firmware where a cable connects the marking engines of two printing devices. The firmware, via the front panel, divides the print job(s) between the two printing devices. (The Sharp AR-507 with tandem cable kit option is an example of this technique.)

Another example of cluster printing provides cluster support through the use of an additional hardware resource, commonly referred to as a print server. The print server generally involves a high-performance general-purpose computer to which print jobs are directed to via a network. The print server includes a specialized software application that allows a print job or copies thereof to be split amongst two or more printing devices that are managed by the server. (Calisto® is an example of this technique.)

Another example of cluster printing includes hardware support that provides high-end solutions generally for color raster image processor separation. The process generally includes dedicated high performance raster image processor and clustering servers, and a server that contains a specialized software application to allow a print job or copies thereof to be split amongst two or more printing devices that are managed by the server. (T/R Systems Velocity® is an example of this technique.)

Thus, while techniques currently exist that enable a print job to be processed, including techniques that enable cluster printing to occur, challenges still exist. For example, print jobs become misprinted due to the mismatching of printing capabilities within the printing environment. Accordingly, it would be an improvement in the art to augment or even replace current techniques with other techniques.

SUMMARY OF THE INVENTION

The present invention relates to processing a print job. In particular, the present invention relates to systems and methods for providing capabilities matching for cluster printing in a heterogeneous printing environment, including performing copy splitting, document splitting, color separation, pool printing, finishing, sheet assembly, and the like.

Implementation of the present invention takes place in association with a computer device that may be used in a printing environment. In at least one implementation, the printing environment includes a system comprising one or more print drivers, a print processor, two or more printing devices and optionally one or more print servers. Capabilities needed to perform a print job are matched with the capabilities of the printing devices that are available in the system. In a further implementation, a print processor is used in performing the capabilities matching. Examples of such capabilities that may be matched in the printing environment include capabilities relating to sheet assembly (e.g., duplex, booklet, N-up, orientation, etc.), collation (e.g., copies, face-up printing, etc.), paper selection (e.g., paper size, paper type, etc.), output trays (e.g., mail trays, large capacity trays, offset trays, etc.), finishing (e.g., stapling, hole punching, etc.), and the like.

While the methods and processes of the present invention have proven to be particularly useful in the area of cluster printing, those skilled in the art will appreciate that the methods and processes can be used in a variety of system configurations to selectively match printing capabilities needed to process one or more print jobs with printing capabilities available in the system configurations.

These and other features and advantages of the present invention will be set forth or will become more fully apparent in the description that follows and in the appended claims. The features and advantages may be realized and obtained by means of the instruments and combinations particularly pointed out in the appended claims. Furthermore, the features and advantages of the invention may be learned by the practice of the invention or will be obvious from the description, as set forth hereinafter.

BRIEF DESCRIPTION OF THE DRAWINGS

In order that the manner in which the above recited and other features and advantages of the present invention are obtained, a more particular description of the invention will be rendered by reference to specific embodiments thereof, which are illustrated in the appended drawings. Understanding that the drawings depict only typical embodiments of the present invention and are not, therefore, to be considered as limiting the scope of the invention, the present invention will be described and explained with additional specificity and detail through the use of the accompanying drawings in which.

DETAILED DESCRIPTION OF THE INVENTION

Figure 1:
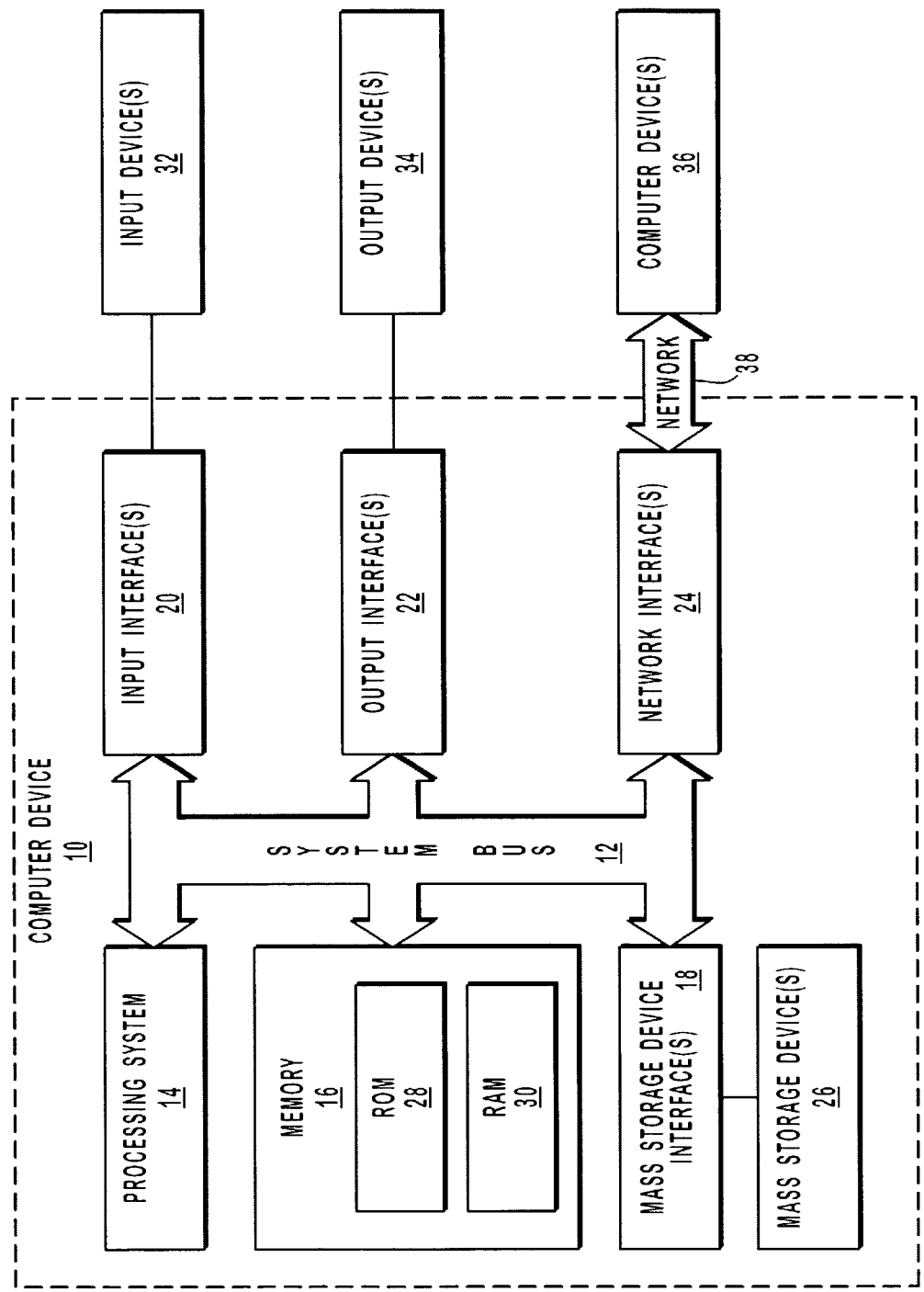
FIG. 1 illustrates a representative system that provides a suitable operating environment for use of the present invention.

The present invention relates to processing a print job. In particular, the present invention relates to systems and methods for providing capabilities matching for cluster printing in a heterogeneous printing environment, including performing copy splitting, document splitting, color separation, pool printing, finishing, sheet assembly, and the like.

Embodiments of the present invention embrace a computer device that may be used in a printing environment. In one embodiment, a printing environment includes a system comprising one or more print drivers, a print processor, two or more printing devices and optionally one or more print servers. Capabilities needed to process a print job are matched with the capabilities of the printing devices that are available in the system. In a further embodiment, a print processor is used in performing the capabilities matching.

In accordance with embodiments of the present invention, one or more capabilities needed to process a print job are matched to one or more capabilities available in a printing system. In the disclosure and in the claims the term "capability" shall refer to any ability, process or function that may be used to process a print job. Examples of such capabilities include abilities relating to sheet assembly (e.g., duplex, booklet, N-up, orientation, etc.), collation (e.g., copies, face-up printing, etc.), paper selection (e.g., paper size, paper type, etc.), output trays (e.g., mail trays, large capacity trays, offset trays, etc.), finishing (e.g., stapling, hole punching, etc.), and the like.

The following disclosure of the present invention is grouped into two subheadings, namely "Exemplary Operating Environment" and "Matching Printing Capabilities." The utilization of the subheadings is for convenience of the reader only and is not to be construed as limiting in any sense.

Exemplary Operating Environment

As provided above, embodiments of the present invention embrace a computer device that may be used in a printing environment. Accordingly, FIG. 1 and the corresponding discussion are intended to provide a general description of a suitable operating environment in which the invention may be implemented. One skilled in the art will appreciate that the invention may be practiced by one or more computing devices and in a variety of system configurations, including in a networked configuration.

Embodiments of the present invention embrace one or more computer readable media, wherein each medium may be configured to include or includes thereon data or computer executable instructions for manipulating data. The computer executable instructions include data structures, objects, programs, routines, or other program modules that may be accessed by a processing system, such as one associated with a general-purpose computer capable of performing various different functions or one associated with a special-purpose computer capable of performing a limited number of functions. Computer executable instructions cause the processing system to perform a particular function or group of functions and are examples of program code means for implementing steps for methods disclosed herein. Furthermore, a particular sequence of the executable instructions provides an example of corresponding acts that may be used to implement such steps. Examples of computer readable media include random-access memory ("RAM"), read-only memory ("ROM"), programmable read-only memory ("PROM"), erasable programmable read-only memory ("EPROM"), electrically erasable programmable read-only memory ("EEPROM"), compact disk read-only memory ("CD-ROM"), or any other device or component that is capable of providing data or executable instructions that may be accessed by a processing system.

With reference to FIG. 1, a representative system for implementing the invention includes computer device 10, which may be a general-purpose or special-purpose computer. For example, computer device 10 may be a personal computer, a notebook computer, a personal digital assistant ("PDA") or other hand-held device, a workstation, a minicomputer, a mainframe, a supercomputer, a multi-processor system, a network computer, a processor-based consumer electronic device, or the like.

Computer device 10 includes system bus 12, which may be configured to connect various components thereof and enables data to be exchanged between two or more components. System bus 12 may include one of a variety of bus structures including a memory bus or memory controller, a peripheral bus, or a local bus that uses any of a variety of bus architectures. Typical components connected by system bus 12 include processing system 14 and memory 16. Other components may include one or more mass storage device interfaces 18, input interfaces 20, output interfaces 22, and/or network interfaces 24, each of which will be discussed below.

Processing system 14 includes one or more processors, such as a central processor and optionally one or more other processors designed to perform a particular function or task. It is typically processing system 14 that executes the instructions provided on computer readable media, such as on memory 16, a magnetic hard disk, a removable magnetic disk, a magnetic cassette, an optical disk, or from a communication connection, which may also be viewed as a computer readable medium.

Memory 16 includes one or more computer readable media that may be configured to include or includes thereon data or instructions for manipulating data, and may be accessed by processing system 14 through system bus 12. Memory 16 may include, for example, ROM 28, used to permanently store information, and/or RAM 30, used to temporarily store information. ROM 28 may include a basic input/output system ("BIOS") having one or more routines that are used to establish communication, such as during start-up of computer device 10. RAM 30 may include one or more program modules, such as one or more operating systems, application programs, and/or program data.

One or more mass storage device interfaces 18 may be used to connect one or more mass storage devices 26 to system bus 12. The mass storage devices 26 may be incorporated into or may be peripheral to computer device 10 and allow computer device 10 to retain large amounts of data. Optionally, one or more of the mass storage devices 26 may be removable from computer device 10. Examples of mass storage devices include hard disk drives, magnetic disk drives, tape drives and optical disk drives. A mass storage device 26 may read from and/or write to a magnetic hard disk, a removable magnetic disk, a magnetic cassette, an optical disk, or another computer readable medium. Mass storage devices 26 and their corresponding computer readable media provide nonvolatile storage of data and/or executable instructions that may include one or more program modules such as an operating system, one or more application programs, other program modules, or program data. Such executable instructions are examples of program code means for implementing steps for methods disclosed herein.

One or more input interfaces 20 may be employed to enable a user to enter data and/or instructions to computer device 10 through one or more corresponding input devices 32. Examples of such input devices include a keyboard and alternate input devices, such as a mouse, trackball, light pen, stylus, or other pointing device, a microphone, a joystick, a game pad, a satellite dish, a scanner, a camcorder, a digital camera, and the like. Similarly, examples of input interfaces 20 that may be used to connect the input devices 32 to the system bus 12 include a serial port, a parallel port, a game port, a universal serial bus ("USB"), a firewire (IEEE 1394), or another interface.

One or more output interfaces 22 may be employed to connect one or more corresponding output devices 34 to system bus 12. Examples of output devices include a monitor or display screen, a speaker, a printer, and the like. A particular output device 34 may be integrated with or peripheral to computer device 10. Examples of output interfaces include a video adapter, an audio adapter, a parallel port, and the like.

One or more network interfaces 24 enable computer device 10 to exchange information with one or more other local or remote computer devices, illustrated as computer devices 36, via a network 38 that may include hardwired and/or wireless links. Examples of network interfaces include a network adapter for connection to a local area network ("LAN") or a modem, wireless link, or other adapter for connection to a wide area network ("WAN"), such as the Internet. The network interface 24 may be incorporated with or peripheral to computer device 10. In a networked system, accessible program modules or portions thereof may be stored in a remote memory storage device. Furthermore, in a networked system computer device 10 may participate in a distributed computing environment, where functions or tasks are performed by a plurality of networked computer devices.

Figure 2:
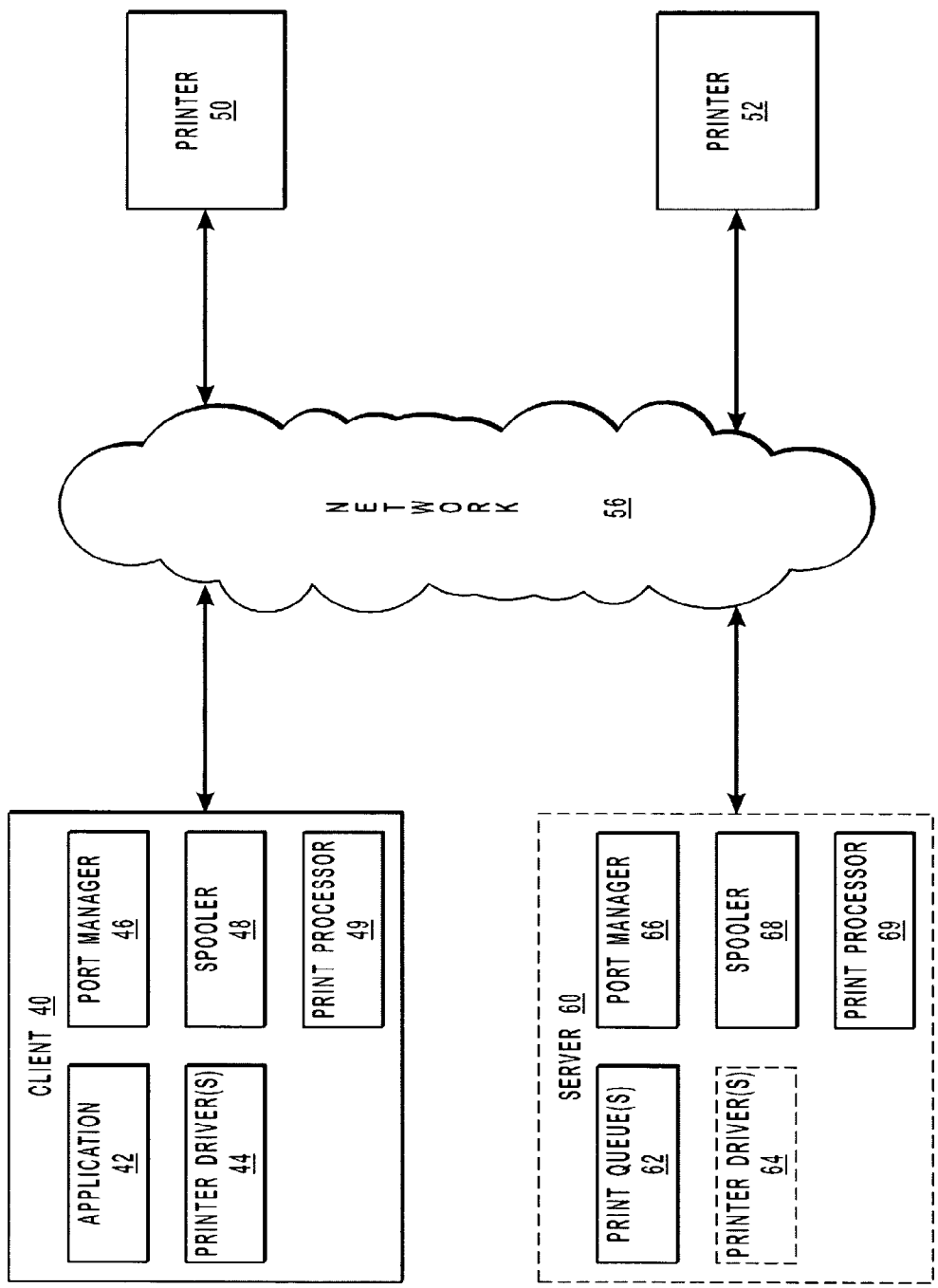
FIG. 2 illustrates a representative networked printing system configuration.

While those skilled in the art will appreciate that embodiments of the present invention may be practiced in a variety of different environments with many types of computer system configurations, FIG. 2 represents a representative networked system configuration that may be used in association with the present invention. While FIG. 2 illustrates an embodiment that includes a client, two printers, and optionally a print server connected to a network, alternative embodiments include more than one client, more than two printers, no server, and/or more than one server connected to a network. Other embodiments include printing environments where one or more computer devices are locally connected to one or more printing devices. Moreover, embodiments in accordance with the present invention also include wireless networked environments, or where the network is a wide area network, such as the Internet.

The representative system of FIG. 2 includes a computer device, illustrated as client 40, which is connected to a plurality of printing devices (printing devices 50 and 52) across network 56. In FIG. 2, printers 50 and 52 each include printing capabilities. In one embodiment, the capabilities of printer 50 are heterogeneous to the capabilities of printer 52 (e.g., at least one of the capabilities of printer 50 are different from the capabilities of printer 52). In another embodiment, the capabilities of printer 50 are homogeneous to the capabilities of printer 52.

While printers 50 and 52 are connected to network 56, embodiments of the present invention embrace the use of one or more printing devices that are locally connected to a computer device, that are configured in a peer-to-peer printing environment, or that are configured in a wireless network environment. Further, the printing devices may be one or more multi-function printers MFPs, or facsimile devices.

In the illustrated embodiment, client 40 includes a software application 42, one or more print drivers 44, a port manager 46, a spooler 48, and a print processor 49. In accordance with the illustrated embodiment, a print processor (e.g., print processor 49) is used to match capabilities needed to process one or more print jobs with capabilities available at printers 50 and 52. In a further embodiment, a printer server 60 is included having one or more print queues 62, one or more printer drivers 64, a port manager 66, a spooler 68, and a print processor 69. In such an embodiment, print processor 69 may be used to match capabilities needed to process one or more print jobs with capabilities available at printers 50 and 52.

In other embodiments, the print processor may combine the capabilities matching with other factors in eliminating printers, such as the printer status.

Matching Printing Capabilities

As provided above, embodiments of the present invention embrace the matching of printing capabilities that are needed to process a print job with available capabilities from one or more printing devices. Such capabilities may relate to, for example, sheet assembly (e.g., duplex, booklet, N-up, orientation, etc.), collation (e.g., copies, face-up printing, etc.), paper selection (e.g., paper size, paper type, etc.), output trays (e.g., mail trays, large capacity trays, offset trays, etc.), finishing (e.g., stapling, hole punch, folding, etc.), rendering (e.g., resolution, toner save, color, black & white, etc.).

In some embodiments, a print processor is used to determine the capabilities needed to process a print job. Upon determining that one or more printers of a printer cluster are unable to meet the capabilities required for the print job, the print processor excludes those printers, unless the exclusion is overridden, such as by the user.

The print processor may determine the capabilities of each printing device in a variety of manners. For example, if a printer is locally connected, the print processor may query the printer via bi-directional communication, may query the local spooler via a spooler application program interface ("API") (e.g., GetPrinter( )), or may query a local domain name system ("DNS"). Alternatively, if a printer is connected to a network, the print processor may query a remote spooler via a spooler API (e.g., Get Printer ( )), may query the printer via network protocol (e.g., SNMP or IPP), may query a local or remote DNS server, or may query a printer database maintained by an administrator. If a printer is remotely connected, the print processor may query the local spooler via a Spooler API (e.g., Get Printer( )), may query the printer via a network protocol (e.g., SNMP or IPP), may query a local or remote DNS server, or may query a printer database maintained by and administrator.

In other embodiments, the print processor may query a local or remote process which is managing the printer device (e.g. HP Jet Admin, Sharp PAV).

Figure 3:
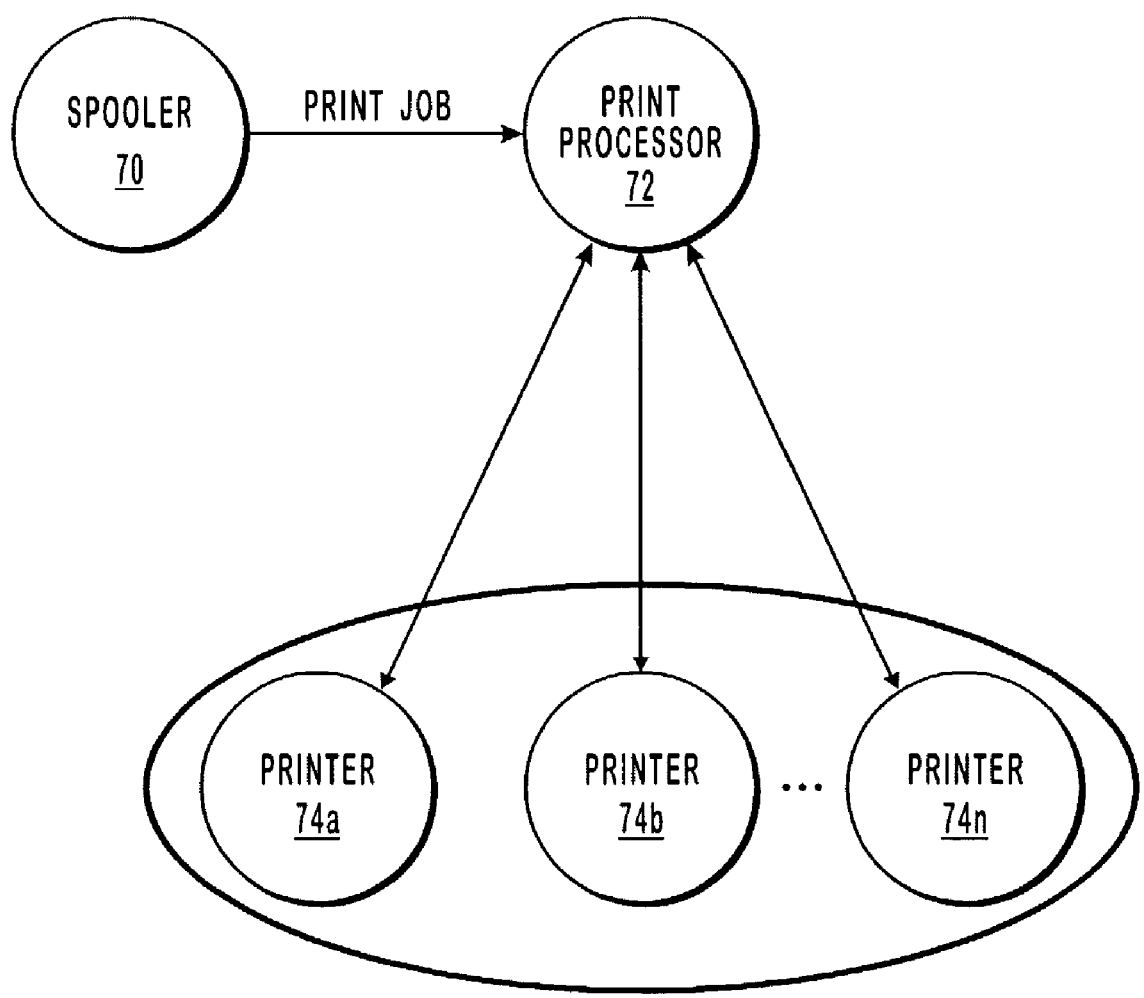
FIG. 3 illustrates a representative method for detection of communicating printers.

Thus, with reference to FIG. 3, a representative embodiment for detecting capabilities available at communicating printers is illustrated. In FIG. 3, a print job is provided from spooler 70 to print processor 72. Printers 74 are locally or remotely (e.g., via a network) connected to print processor 72. Where a printer 74 is connected locally, print processor 72 utilizes Open Port to detect a printer 74. A non-communicating printer fails to Open Port. Alternatively, where a printer 74 is remotely located, a Ping Port may be used (e.g., TCP/IP). A non-communicating printer that is remotely connected or connected via a network, including a wireless network, provides no response.

Figure 4A:
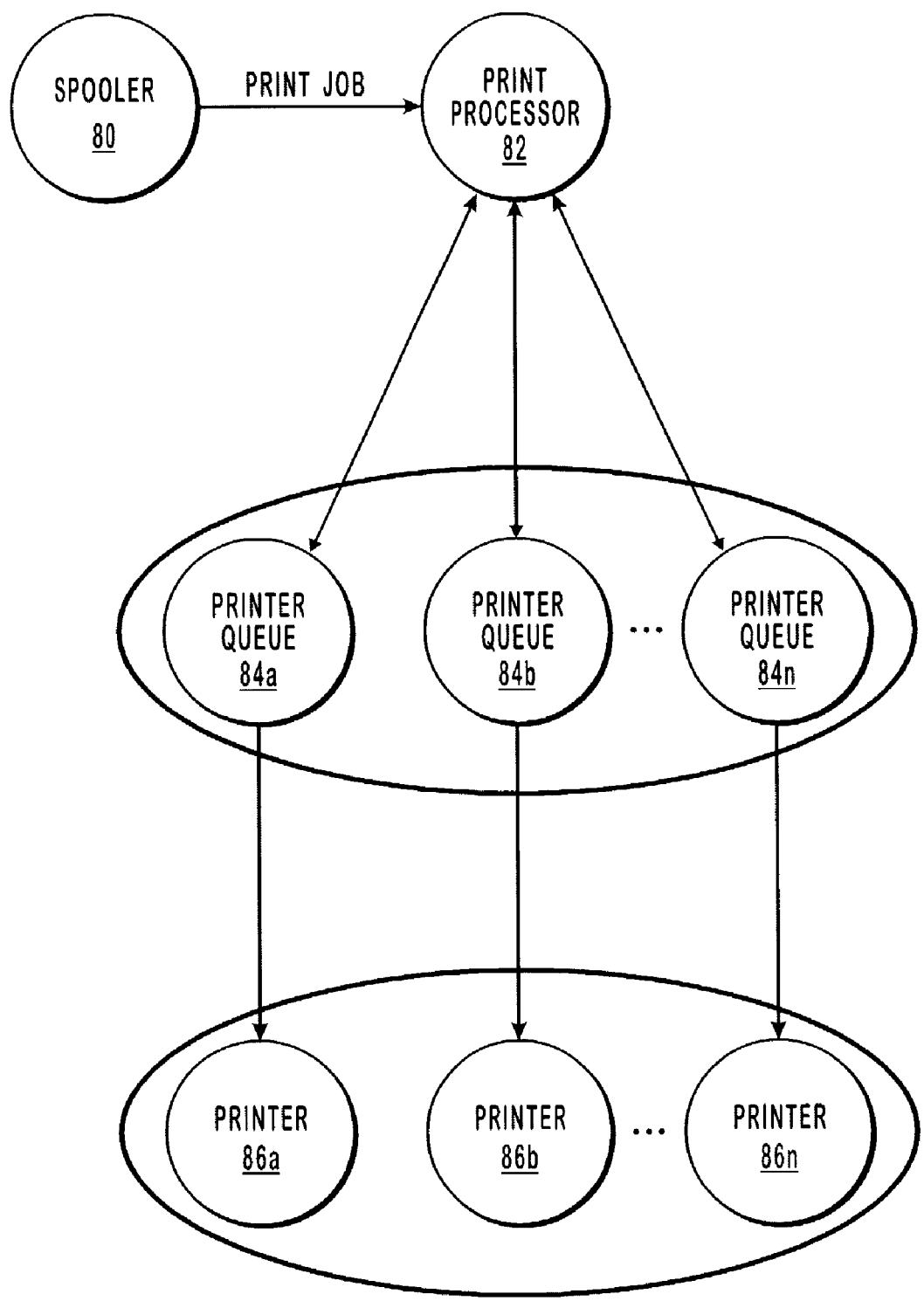
FIG. 4A illustrates a representative embodiment for detecting available printer capabilities in a network queue.

With reference to FIG. 4A, a representative embodiment is illustrated for detecting available printer capabilities in a network queue. In FIG. 4A, spooler 80 provides a print job to print processor 82. Print processor 82 queries one or more printer queues 84 that correspond to one or more printers 86. For example, the printer queues 84 are queried for driver configuration settings from a network spooler (e.g., Ave. PPM).

Figure 4B:
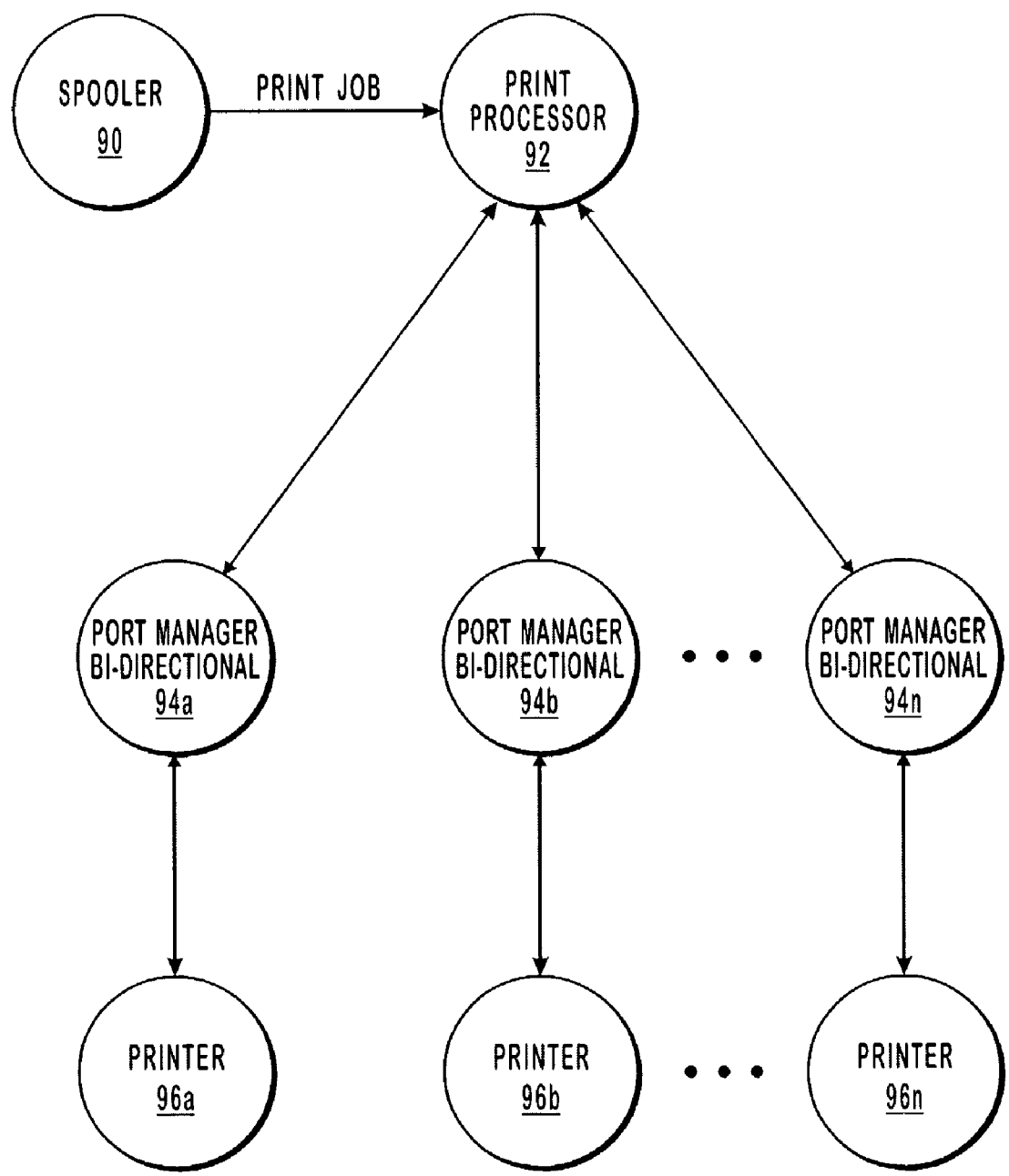
FIG. 4B illustrates a representative embodiment for detecting available printer capabilities in a bi-directional printing environment.

With reference to FIG. 4B, a representative embodiment is illustrated for detecting available printer capabilities in a bi-directional printing environment. In FIG. 4A, spooler 90 provides a print job to print processor 92, which communicates with one or more port managers 94, which correspond to one or more printers 96. In a further embodiment, the communication exchange between print processor 92 and port managers 94 utilize PDL instruction or proprietary protocol. Port managers 94 query the corresponding printers for capabilities. The query utilizes the firmware of printers 96 for the detection of the printer capabilities.

Figure 4C:
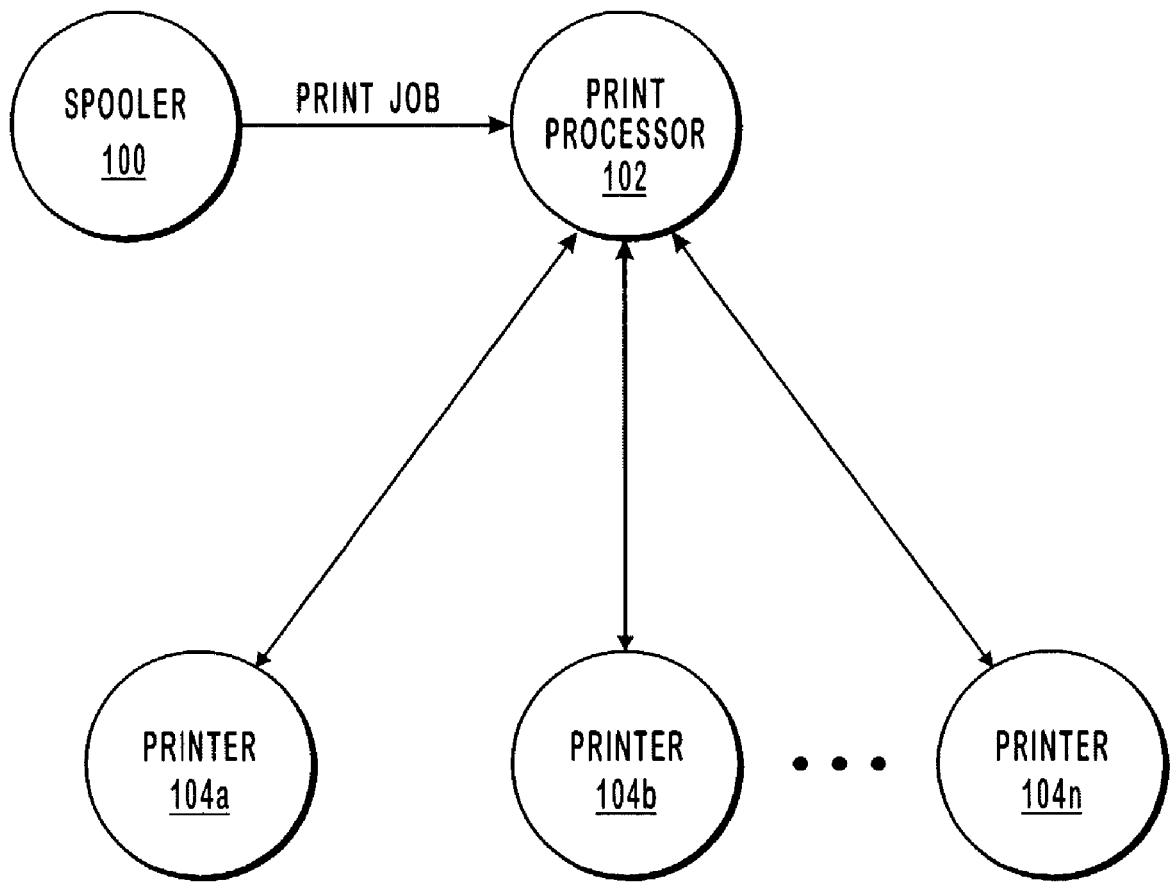
FIG. 4C illustrates a representative embodiment for detecting available printer capabilities using Simple Network Management Protocol ("SNMP") or Internet Printing Protocol ("IPP")

With reference to FIG. 4C, a representative embodiment is illustrated for detecting available printer capabilities using simple network management protocol ("SNMP") or Internet printing protocol ("IPP"). In FIG. 4C, spooler 100 provides a print job to print processor 102, which communicates with printers 104. The communication between print processor 102 and printers 104 utilizes an SNMP query for the printer management information base or an IPP query.

Figure 4D:
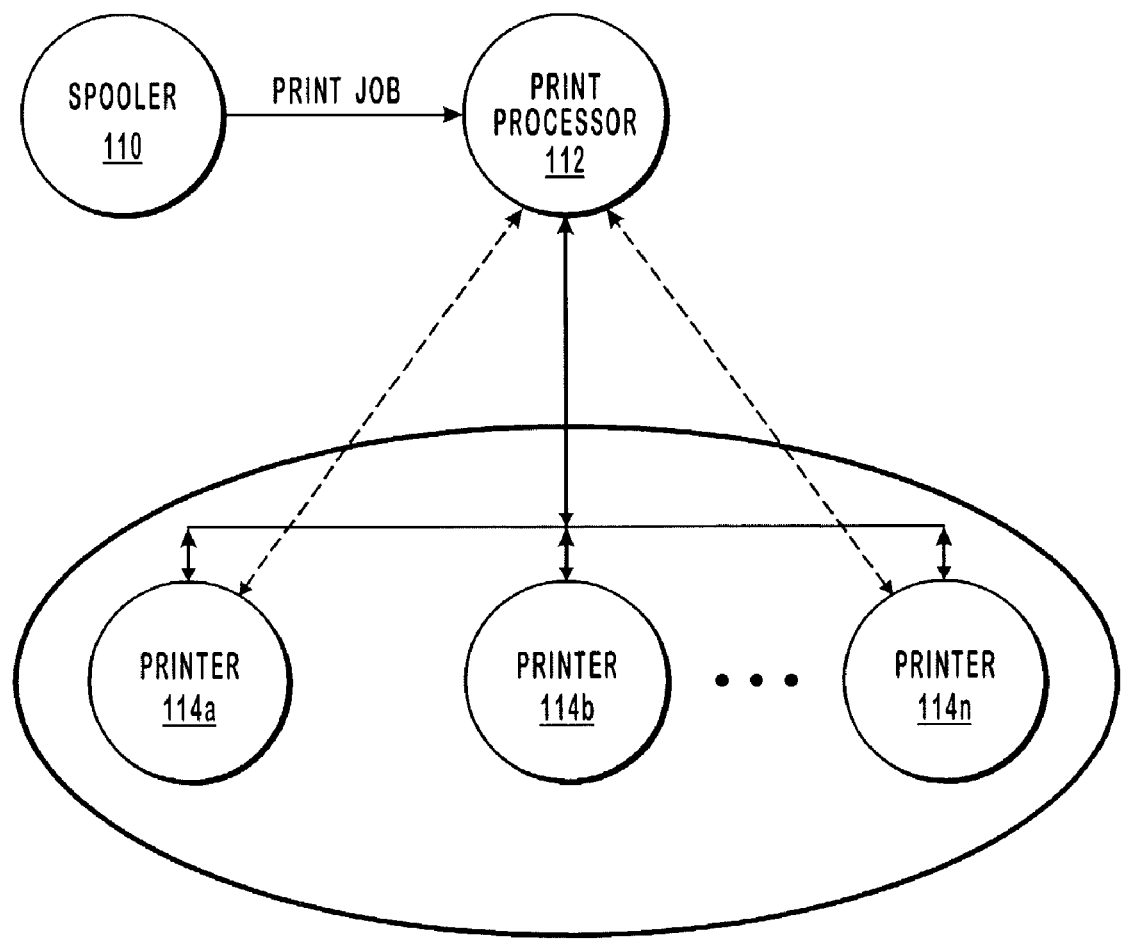
FIG. 4D illustrates a representative embodiment for detecting available printer capabilities using a local area broadcast.

With reference to FIG. 4D, a representative embodiment is illustrated for detecting available printer capabilities using a local area broadcast. In FIG. 4D, spooler 110 provides a print job to print processor 112, which communicates with printers 114. A local area broadcast to one or more, or multicast, subnets of printers 114 may be performed to query responding printers. The query may include, for example, simple network management protocol.

Figure 5:
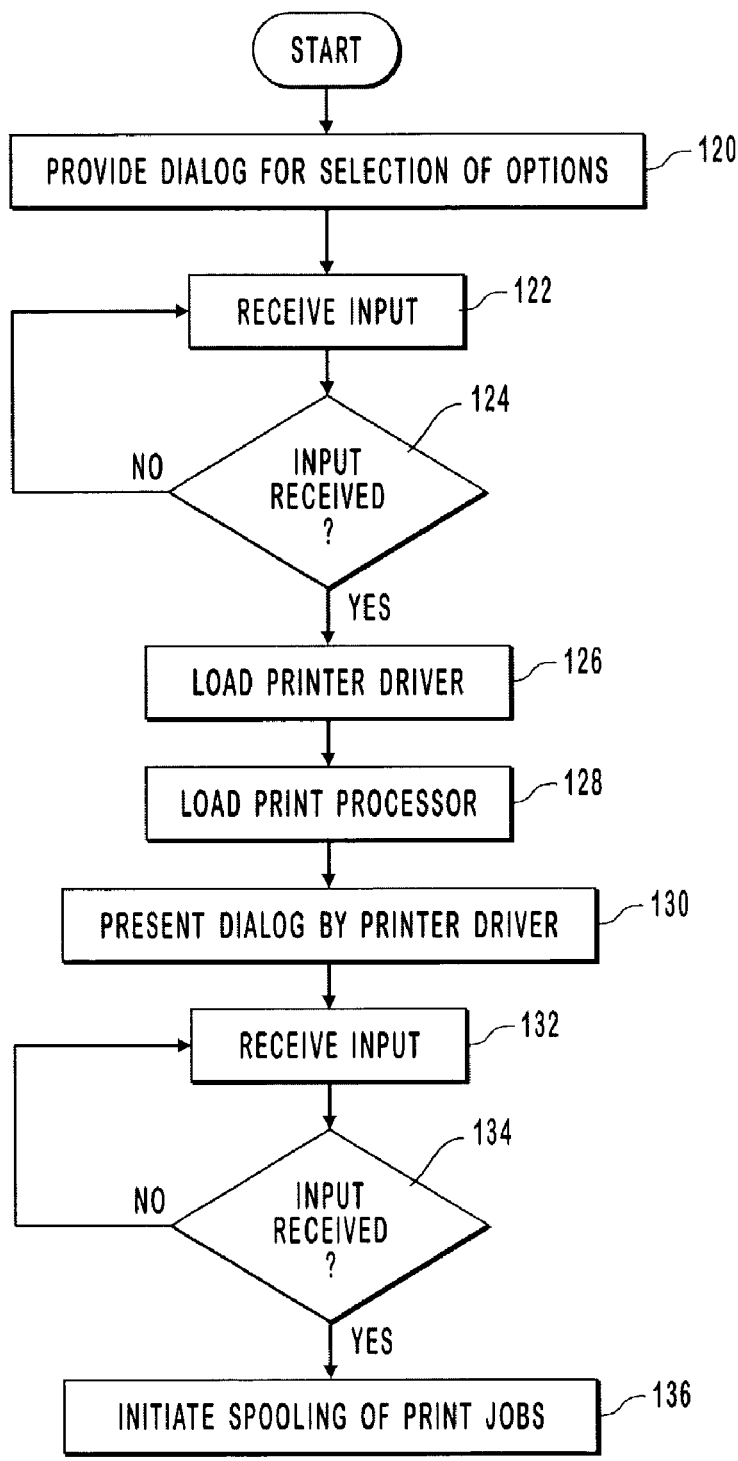
FIG. 5 is a flowchart that illustrates a representative method to enable spooling of a print job.

With reference to FIG. 5, a flowchart is provided that illustrates a representative method to enable spooling of a print job. The method illustrated in FIG. 5 corresponds to a system that includes, for example, two or more heterogeneous printing devices (i.e., printers with non-identical capabilities) connected in a local, remote, or network print environment, a computer device that is capable of spooling a print job, and a printer driver and print processor that are compatible with the printing devices, such as used in association with the Microsoft® Windows 9x, NT 2k, and XP operating systems.

A user initiates a print job that includes the printing of one or more documents, wherein each document includes one or more pages, and wherein one or more sets of the documents are to be printed. The print job may be preprocessed into printer ready data, such as with an application for rendering its output into a page description language ("PDL") (e.g., PCL, Postscript, PDF, TIFF, etc.). Alternatively, the print job may include journaled data, where the rendering instructions is deferred, such as with an Enhanced Meta File ("FMF") or a Printer Meta File ("PMF").

Upon initiation of the print job, the user selects a command or sequence of commands or stimulus to indicate an intention to spool a print job. The computer device responds to the user by presenting the user a dialog (e.g., a Printer UI, command line query, front panel display, etc.) in which the user may select options relating to the spooling of the print job. This is illustrated in FIG. 5 as step 120, where the dialog is provided. One of the options available in the dialog is the selection of the printing device(s) (e.g., printer, plotter, MFP, CD burner, etc.) to which the print job is despooled. At step 122, input is received that corresponds to the options that are available on the dialogue.

A decision is then made at decision block 124 as to whether or not all of the input has been received in order to process the print job. If additional input is needed to process the print job, execution returns back to Step 122 to receive the rest of the input. Alternatively, when it is determined that all of the input has been received in order to process the print job, execution proceeds to step 126.

Once the printing device is selected by the user and all of the input has been received, the computer device responds by loading the printer driver (step 126) and the print processor (step 128) that are associated with the printing device. The printer driver responds, automatically or upon initiation by a user, to the user by presenting the user a dialog at step 130 that provides the user with the ability to select one or more options relating to the capabilities needed to process the print job, such as, print quality, paper size, orientation, tray selection, manual feed, duplexing, collation, stapling, hole-punching, watermarks, etc.

In at least one embodiment, the dialog presented at step 130, includes a dialog on cluster printing. In another embodiment, the dialog presented at step 130 is presented by an application (e.g., by a background process) and a print processor. Alternatively, the dialog is pre-specified.

Within the dialog presented at step 130, the user may select to split the print job across multiple printing devices, to print a plurality of copies of the print job (i.e., job splitting), or to route the print job to the best-fit printer (i.e., pool printing). A display of all selectable printing devices in a printer cluster and printer's capabilities may be provided, wherein the user may select one or more for despooling the print job.

At Step 132, input is received, wherein the input corresponds to options made available at step 130. A decision is then made at decision block 134 as to whether or not all of the input has been received. If it is determined at decision block 134 that all of the input has not yet been received, execution returns back to step 132 until all information has been received. Once the user has completed selecting options specific to both the print job and the printing device(s), the computing device initiates the spooling of the print job at step 136.

Figure 6:
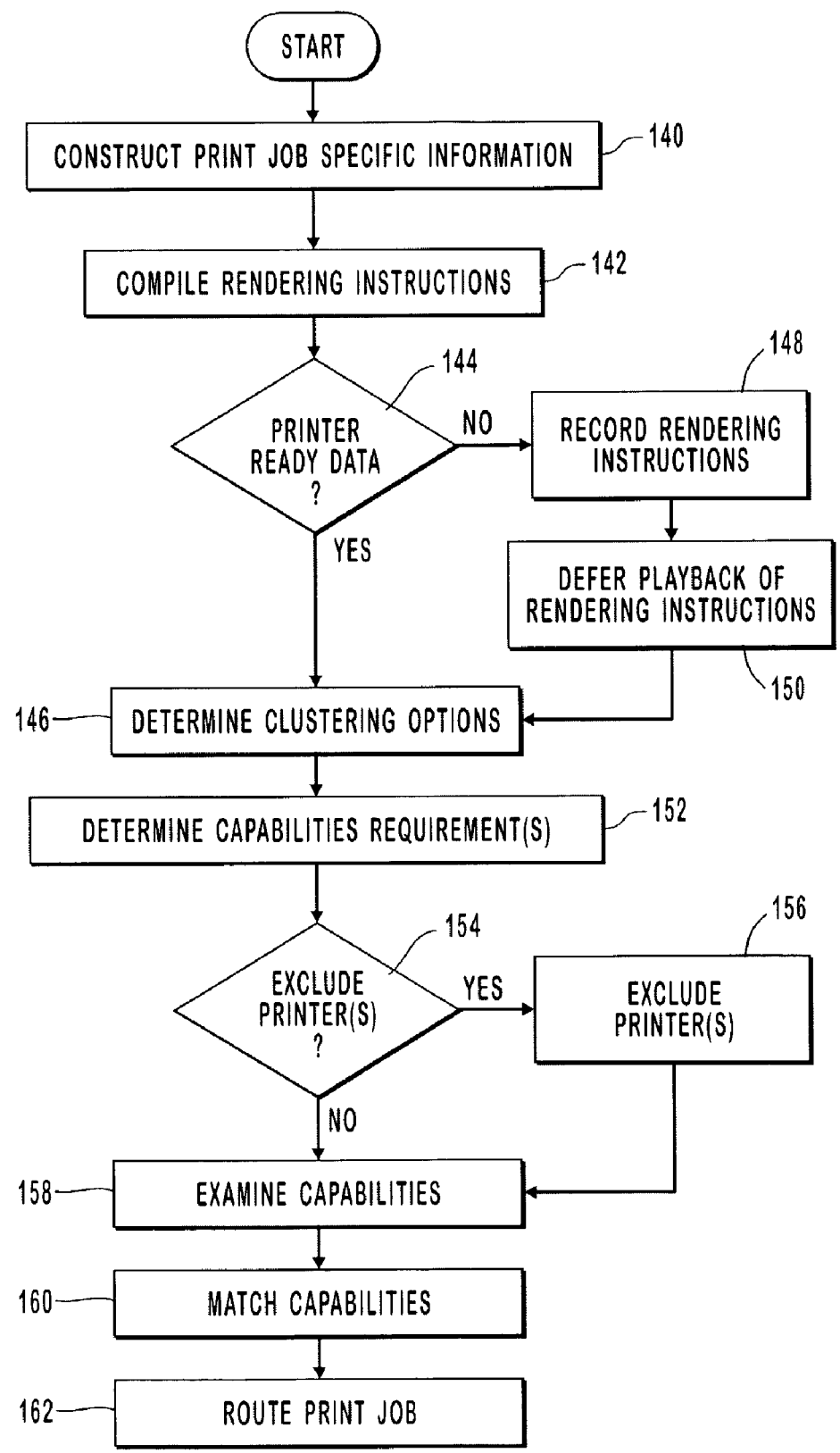
FIG. 6 is a flowchart that illustrates a representative method to match capabilities and route a print job.

With reference now to FIG. 6, a flowchart is provided that illustrates a representative method to match capabilities and route a print job. Once the user has completed selecting options specific to both the print job and the printing device(s), the computing device initiates the spooling of the print job. Thus, as illustrated in FIG. 6, the printer driver constructs print job specific information (e.g., DEVMODE ) at step 140 and compiles rendering instructions at step 142.

As provided above, the print job may be preprocessed into printer ready data, such as with an application for rendering its output into a page description language ("PDL") (e.g., PCL, Postscript, PDF, TIFF, etc.). Alternatively, the print job may include journaled data, where the rendering instructions is deferred, such as with an Enhanced Meta File ("EMF") or a Printer Meta File ("PMF"). In accordance with some embodiments of the present invention, at least part of the print job may be already rendered into printer ready data, and thus the step of compiling rendering instructions may then be skipped partly or entirely.

A determination is made at decision block 144 as to whether or not the data is in a printer ready form. If it is determined at decision block 144 that the data is in printer-ready form, execution proceeds directly to step 146 to determine clustering options. Alternatively, if it is determined at decision block 144 that the data is not in printer-ready form, execution proceeds to step 148 for the recording of rendering instructions, to step 150 to defer playback of the rendering instructions, and then to step 146.

The output from the printer driver (i.e., spooled print job) may include information of the cluster options selected for the print job, such as instructions for splitting the print job, and/or splitting the printing of copies thereof, and a list of selected printers for which to despool the print job. The output from the printer driver may be referred to as a spool file, with the contents generally referred to as spool data. The data may be preserved on disk, in memory, in cache, or any other computer readable medium.

Thus, once the spool file is completed, the spooler despools the spool file on an immediate or delayed basis to the associated print processor for the selected printing device(s). The print processor reads the spool file and determines if the contents is preprocessed printer ready data (e.g., RAW mode in the Microsoft Operating Systems) or journaled (e.g., EMF mode in the Microsoft Operating System). The print processor also determines the clustering options at step 146, including splitting the print job, and/or splitting copies thereof, and the selected or alternate printing devices. The first selected printing device, may be referred to as the "lead" printing device.

At step 152, the capabilities that are required/needed to process the print job are determined/identified by the print processor. The print processor excludes (i.e., drops) any printing devices that are unable to meet the capabilities that are required for the print job, unless the user or the system overrides the exclusion of the printing device. Thus, a determination is made at decision block 154 as to whether or not one or more printers should be excluded because of lack of available capabilities. If it is determined at decision block 154 to exclude one or more printers, then the printers are excluded at step 156 and execution proceeds to step 158. Alternatively, if it is determined at decision block 154 that no printerts are to be excluded, execution proceeds directly to Step 158.

At step 158 the available capabilities are examined or otherwise identified. As provided above, a print processor may determine the capabilities of each printing device in a variety of manners. For example, if a printer is locally connected, the print processor may query the printer via bi-directional communication, query the local spooler via spooler API (e.g., GetPrinter( )), or query a local DNS server. If a printer is connected across a network, the print processor may query the remote spooler via spooler API (e.g., Get Printer ( )), query the printer via a network protocol (e.g., SNMP or IPP), query a local or remote DNS server, or query a printer database that is maintained by an administrator, or query a process that is managing the printing devices (e.g. HP 3d Admin, Sharp Pay. If a printer is remotely connected, the print processor may query the local spooler via a Spooler API (e.g., Get Printer( )), query the printer via a network protocol (e.g., SNMP or IPP), query a local or remote DNS server, or query a printer database maintained by and administrator.

The print processor examines the printer's capabilities according to the requirements of the print job. Based on such factors, a capabilities machine is calculated and the printers are ordered according to the best-fit match at step 160. The print processor may also take into account other factors such as the availability of the printers, such as status or frequency of being offline, busy and ready to print In an alternate embodiment, the print processor has the ability to emulate one or more capabilities, such as collation, booklet, print order, and N-up printing. In such an embodiment, the print processor determines the capabilities matching of each device as the combination of the device's capabilities and the print processor's capability emulation.

Once the print processor has matched the one or more printers to the print job, the print processor routes the print job, or portions thereof, to the selected or alternate printers at step 162.

Figure 7:
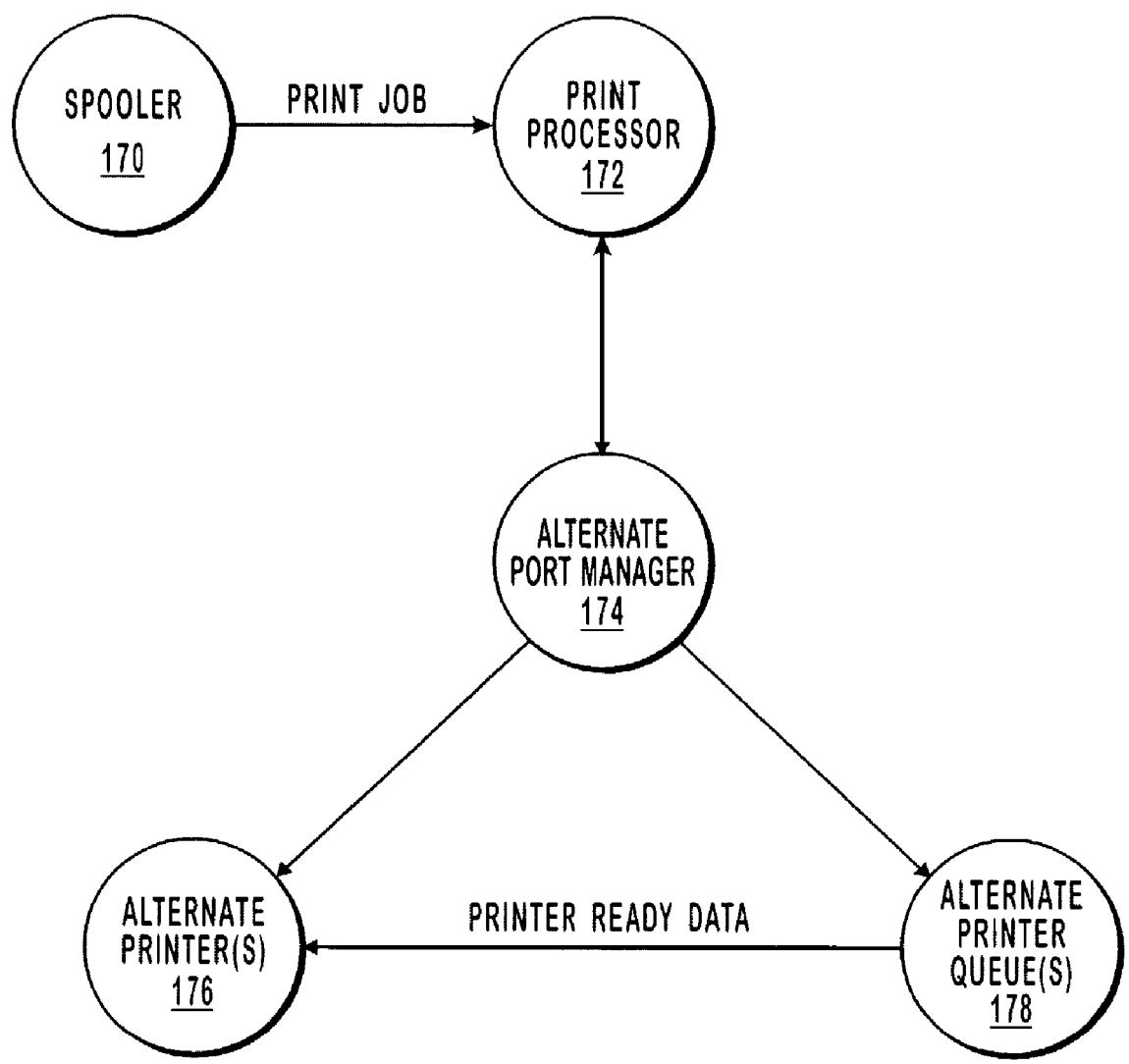
FIG. 7 illustrates a representative method for alternate printer routing.

With reference now to FIG. 7, a representative embodiment is provided for alternate printer routing. In FIG. 7, a print job is provided form spooler 170 to print processor 172, which communicates with alternate port manager(s) 174. Alternate port manager(s) 174 exchanges information directly with alternate printer(s) 176 or through one or more alternate printer queue(s) 178 and then to alternate printer(s) 176.

While reference has been made herein to embodiments of the present invention that embrace the use of Microsoft Windows® operating systems, those skilled in the art will appreciate that embodiments of the present invention also embrace the use of spooling and despooling subsystems of the Apple® Macintosh operating systems, Linux® operating systems, Unix® operating systems, IBM® mainframe operating systems, etc.

Thus, as discussed herein, the embodiments of the present invention relate to processing a print job. In particular, the present invention relates to systems and methods for providing capabilities matching for cluster printing in a heterogeneous printing environment, including performing copy splitting, document splitting, color separation, pool printing, finishing, sheet assembly, and the like.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. In a system that includes a computer device and multiple printing devices, a method for increasing a number of printing devices capable of processing a print job, the method comprising:
   providing a print job to a print processor;
   identifying one or more capabilities needed to process the print job that is not available at one or more printing devices, wherein the one or more capabilities that is not available is selected from the group consisting of:
      (i) collation;
      (ii) booklet printing; and
      (iii) N-up printing;
   using the print processor to identify one or more capabilities available at one or more printing devices;
   using the print processor to emulate the one or more capabilities that is not available at the one or more printing devices to provide one or more additional capabilities to the one or more printing devices whereby the number of printing devices capable of selection by the print processor for processing the print job is increased;
   using the print processor to match the available capabilities and the emulated additional capabilities with needed capabilities to process the print job;
   using the print processor, after matching the capabilities, to select one or more matching printing devices to process the print job based on at least one of the one or more matching printing devices having at least one emulated additional capability matching at least one of the needed capabilities; and
   using the print processor to route the print job to the one or more matching printing devices to process the print job.

2. A method as recited in claim 1, further comprising:
   providing a dialog of options relating to a spooling of the print job;
   receiving input, wherein the input includes the selection of one or more of the options;
   loading a printer driver; and
   loading the print processor.

3. A method as recited in claim 2, wherein one of the options is an option relating to cluster printing.

4. A method as recited in claim 1, wherein said using the print processor to match the available capabilities and the emulated additional capabilities with the needed capabilities comprises excluding at least one of the one or more printing devices for use in processing the print job.

5. A method as recited in claim 1, wherein said using the print processor to match the available capabilities and the emulated additional capabilities with the needed capabilities comprises performing the matching based on at least one of:
   (i) availability of the one or more printing devices;
   (ii) a status of the one or more printing devices; and
   (iii) speed of the one or more printing devices.

6. A method as recited in claim 1, wherein said using the print processor to match the available capabilities and the emulated additional capabilities with the needed capabilities comprises ordering one or more printers of the one or more printing devices according to a best-fit match.

7. In a system that includes a computer device and a plurality of heterogeneous printing devices, a method for selectively matching capabilities to process a print job across multiple printing devices, the method comprising:
   providing a print job to a print processor;
   identifying one or more capabilities needed to process the print job that is not available at one or more printing devices, wherein the one or more capabilities that is not available is selected from the group consisting of:
      (i) collation;
      (ii) booklet printing; and
      (iii) N-up printing;
   using the print processor to identify one or more capabilities available at a plurality of printing devices;
   using the print processor to emulate the one or more capabilities that is not available at the one or more printing devices to provide one or more additional capabilities to the one or more printing devices whereby the number of printing devices capable of selection by the print processor for processing the print job is increased;
   using the print processor to match the available capabilities of the plurality of printing devices and the emulated additional capabilities of the one or more printing devices with capabilities needed to process the print job;
   using the print processor, after matching the capabilities, to select a plurality of matching printing devices to process the print job based on at least one of the plurality of matching printing devices having at least one emulated additional capability matching at least one of the needed capabilities; and
   using the print processor to route the print job to at least two of the plurality of matching printing devices to process the print job.

8. A method as recited in claim 7, wherein the using the print processor to emulate the one or more capabilities that is not available at the one or more printing devices to provide one or more additional capabilities to the one or more printing devices permits splitting the print job to a plurality of printing devices wherein the printing devices processing the print job do not have to have capabilities identical to one another because the print processor emulates at least one capability not shared by the printing devices processing the print job.

9. A method as recited in claim 8, wherein the using the print processor to emulate the one or more capabilities that is not available at the one or more printing devices to provide one or more additional capabilities to the one or more printing devices permits splitting the print job to a plurality of printing devices wherein the printing devices processing the print job do not have to have capabilities identical to the capabilities needed to process the print job because the print processor emulates at least one capability needed to process the print job.

10. A method as recited in claim 7, wherein the using the print processor to emulate the one or more capabilities that is not available at the one or more printing devices to provide one or more additional capabilities to the one or more printing devices permits splitting the print job to a plurality of printing devices wherein the printing devices processing the print job do not have to have capabilities identical to the capabilities needed to process the print job because the print processor emulates at least one capability needed to process the print job.

11. A method as recited in claim 7, wherein the using the print processor to match the available capabilities and the emulated additional capabilities with the needed capabilities comprises ordering one or more printers of the one or more printing devices according to a best-fit match.

12. A method as recited in claim 7, wherein the using the print processor to match the available capabilities and the emulated additional capabilities with the needed capabilities comprises performing the matching based on at least one of:
  (i) availability of the one or more printing devices;
  (ii) a status of the one or more printing devices; and
  (iii) speed of the one or more printing devices.

13. A method as recited in claim 7, wherein the using the print processor to route the print job to at least two of the plurality of matching printing devices to process the print job comprises splitting the print job so different portions of the print job are printed on different printing devices, the splitting occurring based on one of:
  (i) sending different copies of print jobs containing multiple copies to different printing devices;
  (ii) dividing the print job into multiple sections with different sections being sent to different printing devices; and
  (iii) dividing the print job into multiple sections wherein some of the sections have color printing needs and others require only black-and-white printing, and sending the color sections to printing devices capable of printing in color and the black-and-white sections to printing devices incapable of printing in color.

14. In a system that includes a computer device and a plurality of heterogeneous printing devices, a method for selectively matching capabilities to process a print job across multiple printing devices wherein the printing devices processing the print job need not have capabilities exactly matching each other and wherein the printing devices processing the print job need not have capabilities exactly matching the capabilities specified by the print job, the method comprising:
  providing a print job to a print processor;
  identifying one or more capabilities needed to process the print job that is not available at one or more printing devices, wherein the one or more capabilities that is not available is selected from the group consisting of:
    (i) collation;
    (ii) booklet printing; and
    (iii) N-up printing;
  using the print processor to identify one or more capabilities available at a plurality of printing devices;
  using the print processor to emulate the one or more capabilities that is not available at the one or more printing devices to provide one or more additional capabilities to the one or more printing devices whereby the number of printing devices capable of selection by the print processor for processing the print job is increased;
  using the print processor to match the available capabilities of the plurality of printing devices and the emulated additional capabilities of the one or more printing devices with capabilities needed to process the print job;
  using the print processor, after matching the capabilities, to select multiple matching printing devices to process the print job based on at least one of the multiple matching printing devices having at least one emulated additional capability matching at least one of the needed capabilities;
  using the print processor to split the print job for processing on the multiple matching printing devices; and
  using the print processor to route the print job to at least two of the multiple matching printing devices to process the print job.

15. A method as recited in claim 14, wherein the using the print processor to route the print job to at least two of the multiple matching printing devices to process the printjob comprises:
  (i) sending different copies of print jobs containing multiple copies to different printing devices;
  (ii) dividing the print job into multiple sections with different sections being sent to different printing devices; and
  (iii) dividing the print job into multiple sections wherein some of the sections have color printing needs and others require only black-and-white printing, and sending the color sections to printing devices capable of printing in color and the black-and-white sections to printing devices incapable of printing in color.

16. A method as recited in claim 14, wherein the using the print processor to match the available capabilities and the emulated additional capabilities with the needed capabilities comprises ordering one or more printers of the one or more printing devices according to a best-fit match.

17. A method as recited in claim 14, wherein the using the print processor to match the available capabilities and the emulated additional capabilities with the needed capabilities comprises performing the matching based on at least one of:
  (i) availability of the one or more printing devices;
  (ii) a status of the one or more printing devices; and
  (iii) speed of the one or more printing devices.

* * * * *